US009003076B2

(12) United States Patent
Biem (10) Patent No.: US 9,003,076 B2
(45) Date of Patent: Apr. 7, 2015

(54) IDENTIFYING ANOMALIES IN ORIGINAL METRICS OF A SYSTEM

(71) Applicant: International Business Machines Corporation, Armonk, NY (US)

(72) Inventor: Alain E. Biem, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/904,556

(22) Filed: May 29, 2013

(65) Prior Publication Data

US 2014/0359363 A1   Dec. 4, 2014

(51) Int. Cl.
*H04N 9/64* (2006.01)
*G06F 11/30* (2006.01)
*H04N 5/217* (2011.01)

(52) U.S. Cl.
CPC .......... *G06F 11/3024* (2013.01); *H04N 5/2173* (2013.01)

(58) Field of Classification Search
CPC .............................. H04N 5/2173; H04N 5/367
USPC .......................... 348/247; 375/240.27; 714/16
See application file for complete search history.

(56) References Cited

U.S. PATENT DOCUMENTS

| 8,229,686 B2 | 7/2012 | Rawat |
| 8,233,958 B2 | 7/2012 | Brauker et al. |
| 8,234,082 B1 | 7/2012 | Bridge et al. |
| 2012/0203511 A1 | 8/2012 | DeVaul et al. |

FOREIGN PATENT DOCUMENTS

WO    WO 2005109893 A2  * 11/2005
WO    WO2010006087 A1    1/2010

OTHER PUBLICATIONS

Huang et al., "Communication-Efficient Online Detection of Network-Wide Anomalies," INFOCOM 2007, 26th IEEE International Conference on Computer Communications, IEEE, May 2007, pp. 1-9.
Lakhina et al., "Diagnosing Network-Wide Traffic Anomalies," SIGNCOM'04, Aug. 30-Sep. 3, 2004, Portland, Oregon, USA, pp. 219-230.
Li et al., "Parsimonious Linear Fingerprinting for Time Series," Proceedings of the VLDB Endownment, vol. 3, No. 1, Copyright 2010 VLDB Endowment 21508097/, Sep. 2010, pp. 1-13.
Roughan et al., "Combining Routing and Traffic Data for Detection of IP Forwarding Anomalies," SIGMETRICS'04, New York, 2004 (no further date information available), pp. 1-12.

(Continued)

*Primary Examiner* — Ernest Unelus
(74) *Attorney, Agent, or Firm* — Jeff Tang, Esq.; Blanche E. Schiller, Esq.; Heslin Rothenberg Farley & Mesiti P.C.

(57) ABSTRACT

An anomalous component within a processing system is identified. One or more transformed metrics of a processing system being monitored are analyzed, and an anomaly in the processing system is detected. Based on detecting the anomaly, at least one transformed metric is inversely transformed to obtain at least one suspect original metric. Using the at least one suspect original metric, the anomalous component is identified.

19 Claims, 6 Drawing Sheets

(56) References Cited

OTHER PUBLICATIONS

Salatian et al., "Using Time Series Analysis to Enhance Tele-Monitoring of Building Sensor Data," 2012 International Conference on System Engineering and Modeling (ICSEM 2012) IPCSIT vol. 34, 2012 (no further date information available), pp. 13-17.

Biem, Alain E., "Detecting Anomalies in Real-Time in Multiple Time Series Data with Automated Thresholding," U.S. Appl. No. 13/535,743, filed Jun. 28, 2012, pp. 1-30.

Biem, Alain E., "Detecting Anomalies in Real-Time in Multiple Time Series Data with Automated Thresholding," U.S. Appl. No. 13/558,737, filed Jul. 26, 2012, pp. 1-33.

* cited by examiner

$$D(i) = \alpha \frac{\overline{(soKPIs(i)} - \mu oKPIs(i))^2}{\sigma oKPIs(i)}$$

IDENTIFYING ANOMALIES IN ORIGINAL METRICS OF A SYSTEM

BACKGROUND

One or more aspects relate, in general, to monitoring processing environments, and in particular, to identifying anomalies in such environments.

Large-scale hosting infrastructures and platforms form many processing environments including those having computing systems used in cloud computing and enterprise data centers, as examples. The size of these computing systems, the number of transactions that are performed by the systems, and the large amount of data processed render these systems vulnerable to anomalies. An anomaly is an unexpected change in incoming data or a pattern in the incoming data that deviates from the expected behavior. Anomalies arise from, for example, bottlenecks within the system, memory leaks, hardware failures, etc.

Monitoring data on complex computing systems for anomalies and recognizing anomalies in real-time prevent such anomalies from accumulating and effecting the efficiency of the system and, in a worse case scenario, causing the system, or a portion of the system, to fail. Monitoring such systems and detecting anomalous behavior from collected data streams, however, is not a trivial task. The large number of servers or processors, the traffic, the density of computational clusters and the complex interaction among system components pose serious monitoring and management challenges.

BRIEF SUMMARY

Shortcomings of the prior art are overcome and additional advantages are provided through the provision of a method of facilitating identification of an anomalous component within a processing system. The method includes, for instance, analyzing, by a processor, one or more transformed metrics of a processing system being monitored, wherein the analyzing detects an anomaly in the processing system; based on detecting the anomaly, inversely transforming at least one transformed metric of the one or more transformed metrics to obtain at least one suspect original metric; and using the at least one suspect original metric to identify the anomalous component.

Systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects provide a capability to detect and identify an anomaly within a processing environment. In one example, a computing system is monitored via sensors coupled to the system. These sensors collect data regarding the computing system and provide one or more metrics regarding the data. These metrics, referred to as key performance indicators (KPIs), include, for instance, an average of the data, a standard deviation of the data, and/or other metrics. It is usual that this data or metrics are passed on to a back-end processing system. Further, it is typical for the back-end processing system to transform the original data for better analysis and processing. Thus, when a problem occurs, it occurs on the transformed metrics, not on the original metrics. However, diagnosis on the transformed metrics is of limited value, since transformed metrics are internal to the system, and not visible out of the system. Therefore, in one aspect, diagnosis is provided based on the original metrics. In particular, in one aspect, a capability is provided that lists suspect metrics in the original space, although analysis and detection are performed in the transformed space.

Figure 1A:
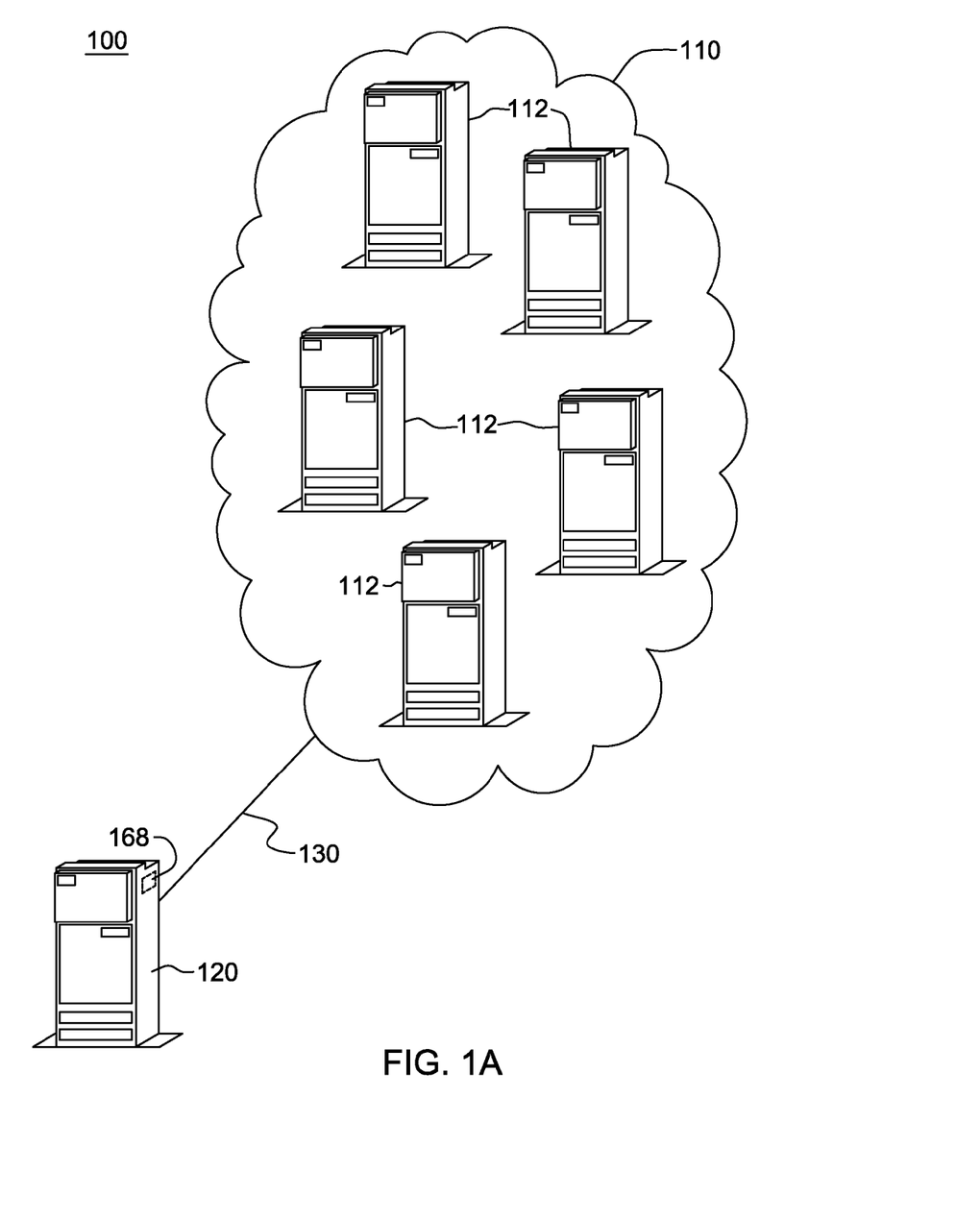
FIG. 1A depicts one example of a processing environment to incorporate and use one or more aspects of the present invention.

One embodiment of a processing environment to incorporate and use one or more aspects of the anomaly detection and identification capability is described with reference to FIG. 1A. In one example, a processing environment 100 includes, for instance, a computing system 110, such as a cloud and/or an enterprise system, coupled to at least one server 120 via a connection 130. Connection 130 is, for instance, a network connection, including, but not limited to, a wireless and/or a wired connection.

In this embodiment, server 120 monitors computing system 110 and detects and identifies anomalies for the system, as described in further detail herein. However, in other embodiments, the monitoring, detecting and/or identifying are performed by one or more computing units 112 of computing system 110. In yet a further embodiment, the monitoring, detecting and/or identifying are performed by the server and/or one or more of the computing units. That is, the anomaly detection/identification functionality may be centralized on one server or computing unit, or distributed among multiple servers and/or computing units.

Computing system 110 includes, for instance, one or more computing units 112, such as one or more servers or other types of computing units. One or more of the computing units may be coupled to one or more other computing units of the system or one or more of the computing units may be stand-alone units as compared to other units of computing system 110.

In one embodiment, one or more of computing units 112 is structurally similar to server 120, and an example of this structure is described with reference to FIG. 1B. Since, in this embodiment, the monitoring, detecting and identifying are performed by server 120, further details of server 120 are described. However, these details may equally apply to one or more of the computing units.

Figure 1B:
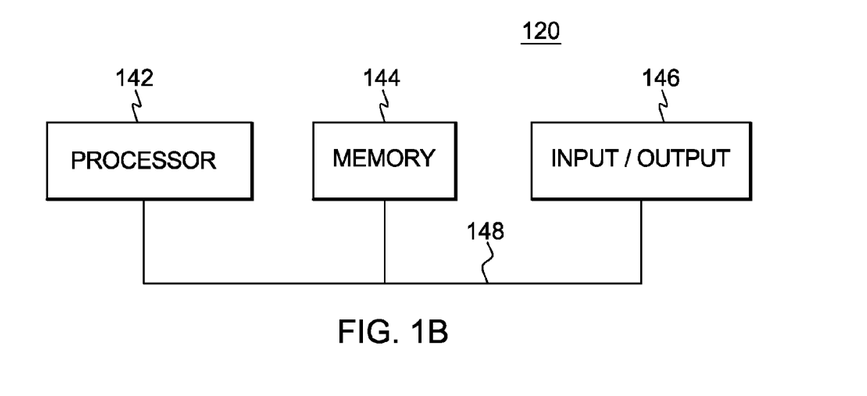
FIG. 1B depicts one embodiment of further details of a server of FIG. 1A.

Referring to FIG. 1B, in one embodiment, server 120 includes one or more processors 142 (e.g., central processing units), a memory 144, and one or more input/output devices and/or interfaces 146 coupled to one another via, for example, one or more buses 148 and/or other connections.

In one example, processor 142 is based on the Power Architecture offered by International Business Machines Corporation. One embodiment of the Power Architecture is described in "Power ISA™ Version 2.06 Revision B," International Business Machines Corporation, Jul. 23, 2010. POWER ARCHITECTURE® is a registered trademark of International Business Machines Corporation, Armonk, N.Y., USA. Other names used herein may be registered trademarks, trademarks, or product names of International Business Machines Corporation or other companies.

In a further embodiment, processor 142 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-09, Tenth Edition, September, 2012. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 142 is based on an Intel architecture offered by Intel Corporation. One embodiment of the Intel architecture is described in "Intel® 64 and IA-32 Architectures Developer's Manual: Vol. 2A, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013. Intel® is a registered trademark of Intel Corporation, Santa Clara, Calif.

Figure 1C:
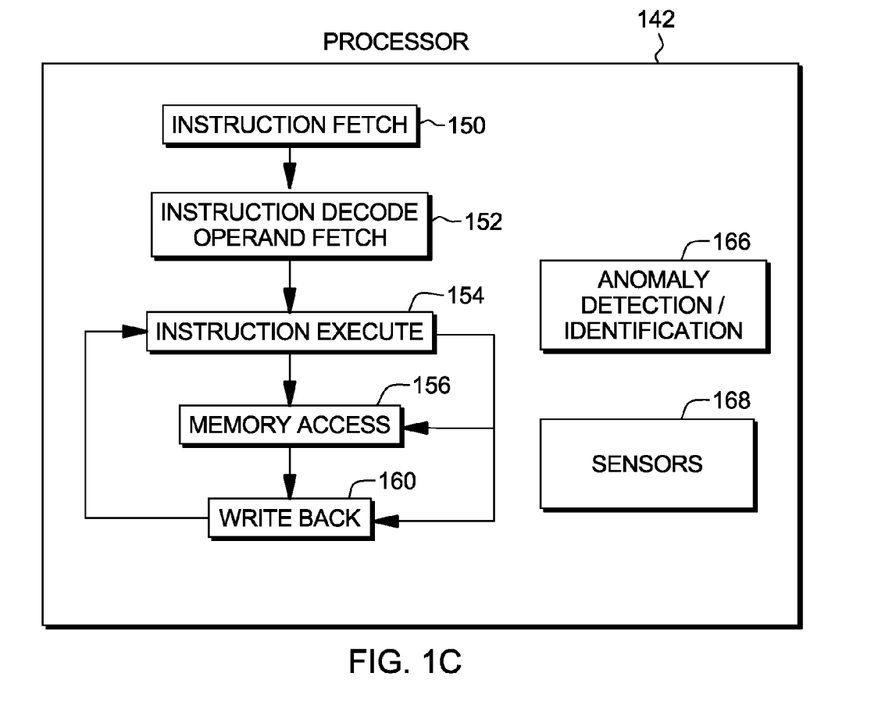
FIG. 1C depicts one embodiment of further details of a processor of FIG. 1B.

Processor 142 includes a plurality of functional components used to execute instructions. As depicted in FIG. 1C, these functional components include, for instance, an instruction fetch component 150 to fetch instructions to be executed; an instruction decode unit 152 to decode the fetched instructions and to obtain operands of the decoded instructions; an instruction execute component 154 to execute the decoded instructions; a memory access component 156 to access memory for instruction execution, if necessary; and a write back component 160 to provide the results of the executed instructions. One or more of these components may, in accordance with an aspect, provide anomaly detection/identification functionality by including at least a portion of or have access to an anomaly detection/identification component 166.

Additionally, in one embodiment, processor 142 includes one or more sensor modules 168 (a.k.a., sensors). The sensors are used to collect data regarding the computing system and to provide one or more metrics (KPIs) regarding the data. These metrics include, for instance, an average of the data, a standard deviation of the data, and/or other metrics. The data includes relevant data relating to the performance of the computing system, such as response time of the computing units, memory used, and/or number of transactions per a specified period of time, as examples. Other types of data may be collected depending on the processing system to be analyzed or other factors. Further, other types of metrics may be determined.

In a further embodiment, the sensors are separate from, but coupled to, the processor.

Figure 2A:
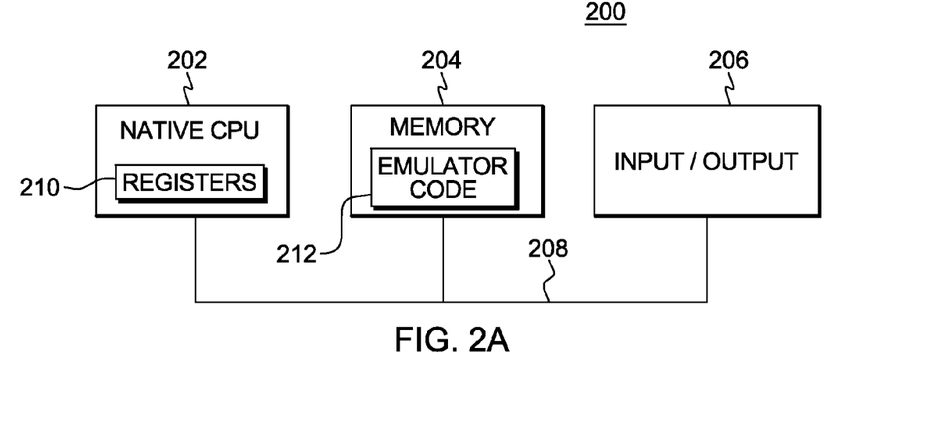
FIG. 2A depicts another example of a server to incorporate and use one or more aspects of the present invention.

Another embodiment of a server to incorporate and use one or more aspects is described with reference to FIG. 2A. In this example, a server 200, such as server 120, (or in another embodiment, a computing unit 112), includes, for instance, a native central processing unit 202, a memory 204, and one or more input/output devices and/or interfaces 206 coupled to one another via, for example, one or more buses 208 and/or other connections. As examples, server 200 may include a PowerPC processor, a pSeries server or an xSeries server offered by International Business Machines Corporation, Armonk, New York; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
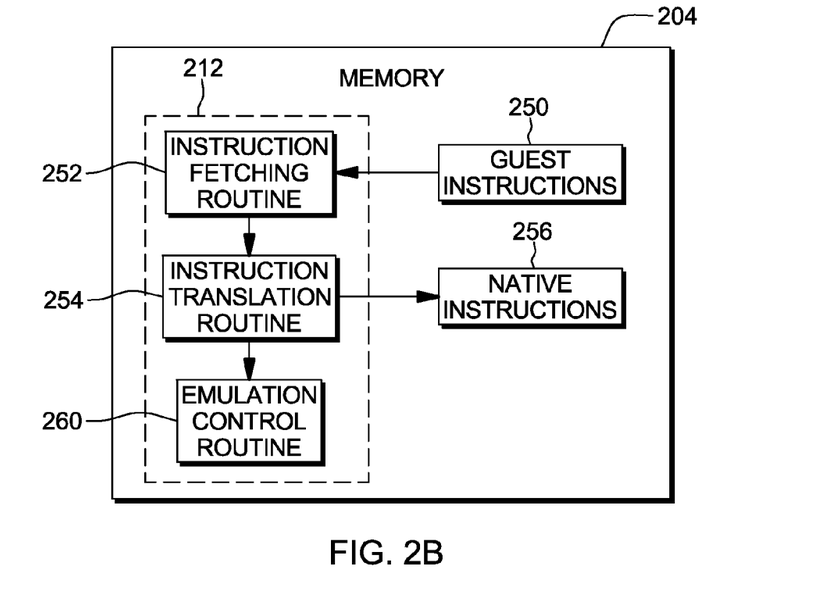
FIG. 2B depicts further details of one embodiment of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 142, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, the emulator code is used to monitor processing systems and to detect and identify anomalies within such systems, as described herein.

One embodiment of the logic to detect and identify anomalies of a processing environment is described with reference to FIG. 3. This logic is performed, in one embodiment, by a server, such as server 120, or by another computing unit.

Figure 3:
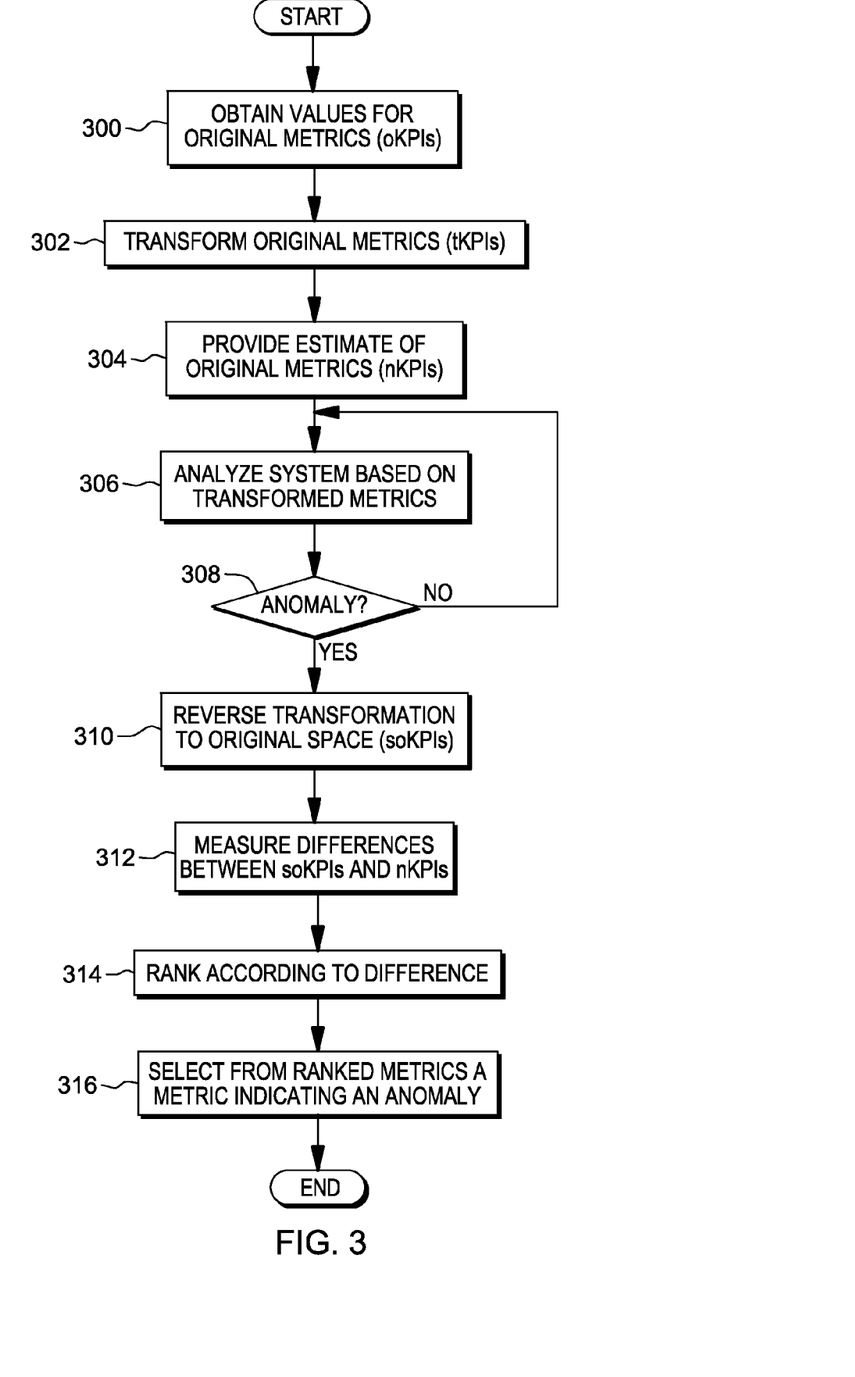
FIG. 3 depicts one embodiment of the logic to identify anomalies in a processing environment.

Referring to FIG. 3, initially, values for one or more original metrics are obtained, STEP 300. For instance, one or more sensors collect data in time series from one or more of the computing units. Time series is a sequence of data points, measured typically at successive time instants spaced at uniform time intervals. The data can be any type of data depending on the system being monitored. In this example, the data relates to the performance of the computing system, and thus, includes, for instance, response times, memory used, and/or number of transactions processed within a specified time period, etc. Based on this collected data, one or more values for one or more metrics relating to the collected data, such as the mean (e.g., average response time, average memory used, etc.), the standard deviation, etc. for each type of data collected, are computed. These metrics are referred to as original KPIs (oKPIs).

To facilitate detecting anomalies in the computing system, the original metrics are transformed via a transformation function to provide transformed metrics (tKPIs), STEP 302. Any type of transformation function may be used. Although it need not be linear, in one embodiment, it is pseudo-invertible (that is, most of the original data is recovered). In one particular example, a multi-variate transformation is used that converts each metric to a multi-variate KPI (mKPI) by applying a transform. The transform moves each KPI into a new space, a transformed space, that is more amenable to anomaly tracking. The multi-variate transform reduces the actual dimensions of the KPI by transforming the original matrix into an mKPI for each time in the time series.

Thus, rather than use the oKPI, which is a view of time series data in the space of the resource from which it originated (i.e., the original space), this time series data, once the KPI is converted to a mKPI, is viewed and understood in the context of the computer system as a whole. In this space, the movement and patterns of the data from a given time series, regardless of the resource in the computer system for which they originate, are more readily apparent.

Techniques of deriving the mKPI from the KPI include, but are not limited to, Discrete Cosine Transform (DCT), Discrete Wavelet Transform (DWT), multi-dimensional to multi-dimensional mapping, and/or a statistically-estimated transform, such as Principle Component Analysis (PCA). Like the oKPI, the mKPI also represents characteristics of data in a time series at a given time (t).

Continuing with reference to FIG. 3, additionally, in one embodiment, an estimate is provided of the original metrics representing the system in its non-anomalous state (nKPIs), STEP 304. In one embodiment, this includes using the means ($\mu$oKPIs) and variances ($\Omega$oKPIs) of the original metrics estimated over time or estimated from a window of data. For instance, for a type of data (e.g., response time), a plurality of values is obtained over a period of time, and then, for the means metric, the values are averaged to provide a $\mu$oKPI. This is performed for each type of data (e.g., number of transactions, memory used, etc.), as well as for one or more metrics. For instance, in addition to computing the mean, a standard deviation is also computed. Other metrics are also possible.

The system is analyzed based on the transformed metrics, STEP 306. In particular, the monitoring operates on the transformed metrics (tKPIs) and is able to determine anomalies in this transformed space. Any type of mechanism may be used for determining anomalies. For instance, a tracking system may be used that tracks values for the transformed metrics for a period of time, and based on the tracking, determines that a particular value deviates from an expected value by, for instance, a predetermined amount, and thus, is considered anomalous. Other mechanisms using time series analysis techniques, such as Autogressive Models, Tracking filter, or special analysis, are also possible.

Based on the monitoring, a determination is made as to whether an anomaly was detected, INQUIRY 308. If not, processing continues with analyzing the system based on the transformed metrics. Otherwise, one or more suspect transformed metrics (stKPIs) are provided; and a reverse transformation is performed on each suspect transformed metric back to the original space (soKPIs), STEP 310. For instance, reverse transformation is performed on each suspect metric individually or on the collection of suspect metrics to obtain the metrics in the original space. In one particular example in which the transformation includes a mapping, the reverse transformation includes a reverse mapping (i.e., a mapping back from the transformed space to the original space). Other reverse transformations are possible.

Thereafter, differences between the suspect original metrics (soKPIs) and the estimated metrics (nKPIs) are measured to produce diagnostic scores, STEP 312. The suspect original metrics are then ranked based on the diagnostic scores, STEP 314. Further, at least one suspect original metric is selected from the ranked metrics as the metric indicating the anomaly (e.g., the highest ranked metric is selected), STEP 316.

Further details regarding the logic for detecting and identifying anomalies in a processing system are described with reference to FIGS. 4-5.

Figure 4:
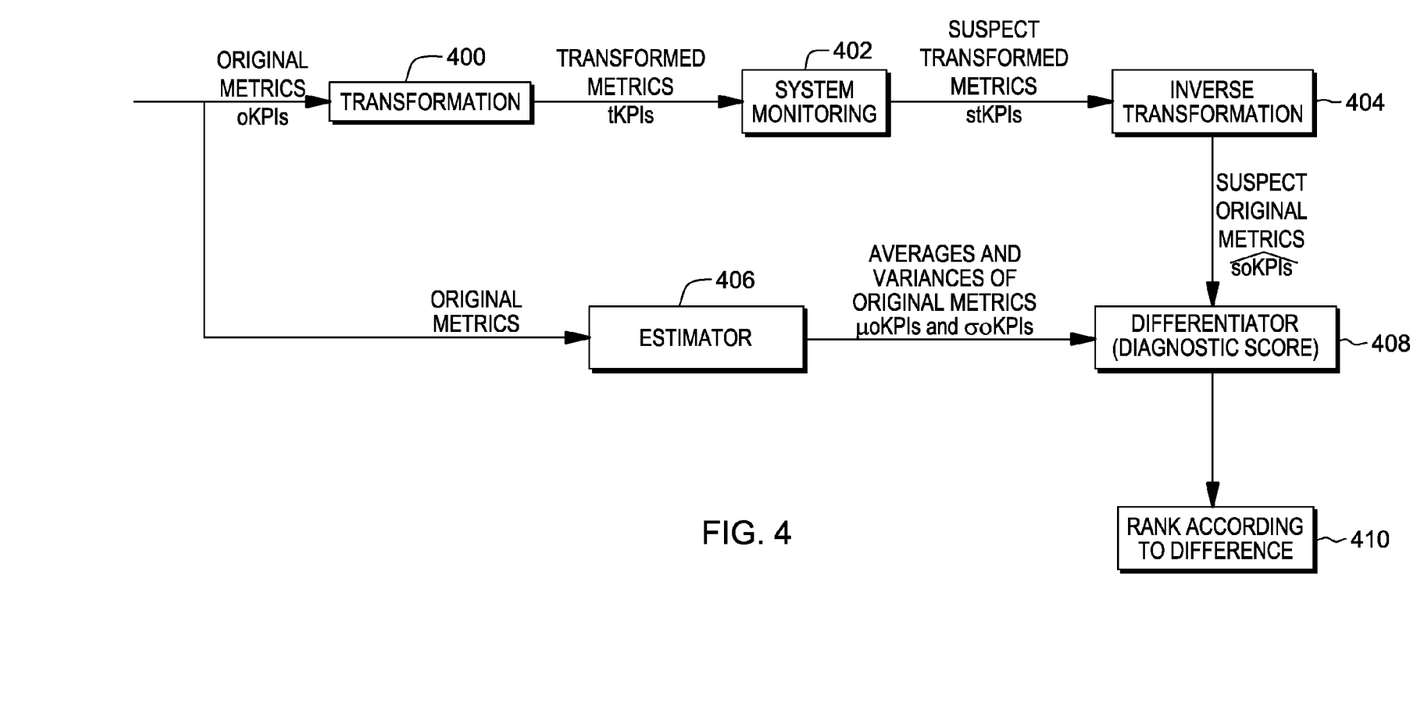
FIG. 4 depicts further details of one embodiment of identifying anomalies in a processing environment.
Figure 5:
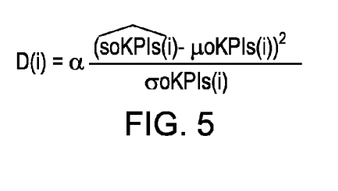
FIG. 5 depicts one embodiment of determining a diagnostic score to be used in identifying anomalies in a processing environment.

Referring initially to FIG. 4, a number of modules are depicted. The separation of individual tasks or functionality into modules in the embodiment of FIG. 4 is a non-limiting example of process distribution and is not indicative of the structure of the computer program code or where this code is executed. One of skill in the art will recognize that the functionality of the computer program code can be embodied in one or more physical modules and executed on one or more processors, in one or more servers or on one or more computing units. FIG. 4 is provided for illustrative purposes to designate different activities which may be executed by a specially configured computer system, and/or embodied in a computer program product.

Referring to FIG. 4, in one embodiment, a transformation module 400 receives input from one or more sensors. For instance, the sensors collect data from one or more of the computing units 112, and provide that data to, for instance, an application, which based on the collected data generates values for one or more metrics. These metrics, referred to as original key performance indicators (oKPIs), include, for instance, the mean, standard deviation, or other type of metrics computed for each type of collected data. The computed metric values are obtained, e.g., by the sensors from the application, and input to transformation module 400. (As used herein, obtained or forms thereof, includes, but is not limited to, for instance, received, provided, had, determined, been forwarded, etc.) The transformation module uses a transform function to transform the original metrics (oKPIs) into transformed metrics (tKPIs). These transformed metrics are then input to a system monitoring module 402.

System monitoring module 402 monitors the system in the space of the transformed metrics and is capable of determining anomalies in this transformed space. Should an anomaly be detected, one or more suspect transformed metrics (stKPIs) are produced and input to an inverse transformation module 404. The inverse transformation module performs a reverse transformation (e.g., using a mathematical function) on the suspect transformed metrics (stKPIs) back to the original space (soKPIs).

In addition to the above, the original metrics (oKPIs) are input to an estimator module 406 which produces an estimate of the original metrics representing the system in its non-anomalous state (nKPIs). In one embodiment, the estimator uses the means ($\mu$oKPIs) and variances ($\Omega$oKPIs) of the original metrics estimated over time or estimated from a window of data.

The output of estimator module 406 and inverse transformation module 404 are input to a differentiator module 408 that is to produce a diagnostic score for each metric. The differentiator computes a measure of the difference between the inversely transformed KPI (soKPIs) and an estimate of the non-anomalous state means ($\mu$oKPIs) and variances ($\Omega$oKPI). In one embodiment, the differentiator uses a simple absolute difference between the metrics, such as, for instance, $|soKPI-\mu oKPI|$. In a further embodiment, the relative ratio of each change, such as $|(soKPI-\mu oKPI/\Omega oKPI|$ is determined (see also FIG. 5). In one example, this differentiator module produces a score for each metric in the original space, representing the degree to which that metric deviates from its normal behavior. The output of the differentiator 408 is input to a ranking module 410, which uses the scores to rank the original metrics with the higher scores first, in this example. In this example, the first metric in the list is most suspect among the original metrics and is a prime indicator of the component of the system at fault. In a further embodiment, the scores could be clustered based on a given criterion and/or ranked by other mechanisms.

Using the scores, the suspect component that is at fault is determined. For instance, each metric is associated with a particular component. As an example, each metric has a corresponding index, and a table, list or other data structure maps the index to a component. Then, when a metric is identified as anomalous, the index of the metric is looked-up in the data structure to determine the corresponding component. An indication of this component is provided, in one example.

Described in detail above is one embodiment of a technique for identifying faulty components on the original metrics of a system when detection of an anomaly has been performed on transformed metrics. This is accomplished, in one embodiment, without requiring explicit knowledge of the transformation details. Further, in one embodiment, it is based on data collected by multiple sensors. Additionally, it provides a less restrictive technique for identifying faulty components.

In one embodiment, in order to detect an anomaly in a system with time series data, the data is transformed into a new set of metrics. However, in order to pinpoint the source of the anomaly, it is to be identified within the original metrics. Thus, the data is inversely transformed when an anomaly is detected. Further, estimates of the non-anomalous state of the original data are computed, and for each suspect metric, a comparison is performed of the non-anomalous state of that metric and the inversely transformed value. A comparison value (e.g., score) is obtained, and the value that indicates, e.g., the largest difference, indicates that is the metric that contains the anomaly.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
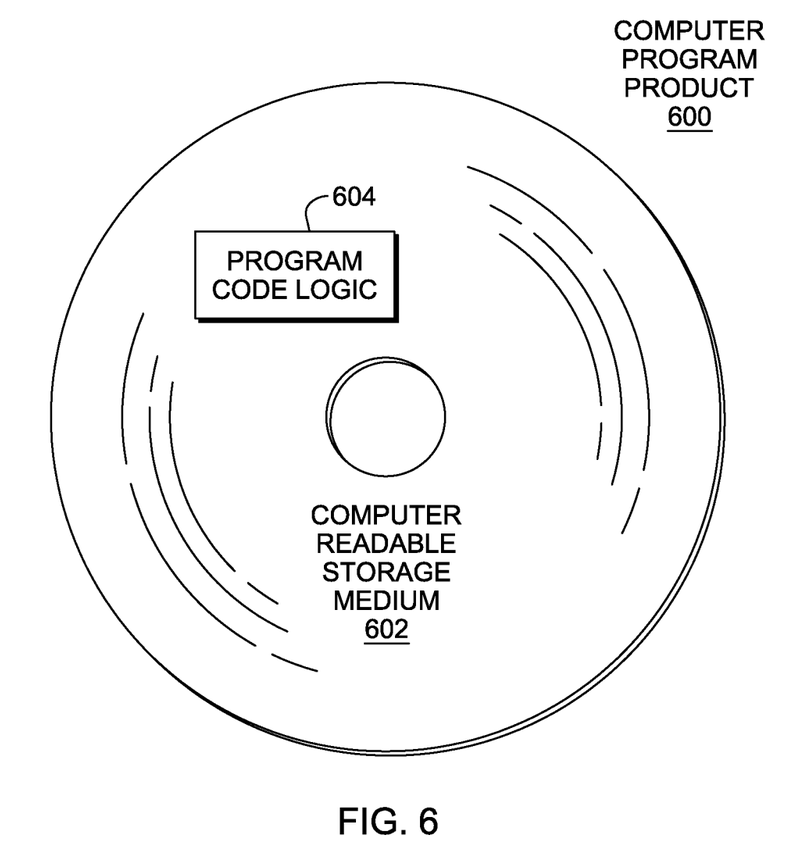
FIG. 6 depicts one embodiment of a computer program product incorporating one or more aspects.

Referring now to FIG. 6, in one example, a computer program product 600 includes, for instance, one or more non-transitory computer readable storage media 602 to store computer readable program code means or logic 604 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects of the present invention. Further, other types of processing environments can use one or more aspects of the present invention. Additionally, instead of using performance data, other types of data may be used to determine other types of anomalies besides computer performance and/or availability issues. The processing environments or systems to be monitored for anomalies can be any type of environment or system that has time series data. It need not be a computing system that is monitored for performance or availability issues, but may be other types of processing environments or systems. For instance, it may be a processing system producing time series data, such as medical data, financial data, etc. The list or types of environments or systems are endless. Many variations are possible.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A method of facilitating identification of an anomalous component within a processing system, said method comprising:

transforming, by a processor, one or more original metrics of a processing system being monitored to obtain one or more transformed metrics, wherein the transforming uses a selected mathematical transformation function, the selected mathematical transformation function comprising a Discrete Cosine Transform, a Discrete Wavelet Transform, a multi-dimensional to multi-dimensional mapping or a statistically-estimated transform;

analyzing, by the processor, the one or more transformed metrics of the processing system being monitored, wherein the analyzing detects an anomaly in the processing system;

based on detecting the anomaly in analyzing the one or more transformed metrics, inversely transforming at least one transformed metric of the one or more transformed metrics to obtain at least one original metric of the one or more original metrics, the inversely transforming using a mathematical transformation function to transform the at least one transformed metric back to the at least one original metric, and the at least one original metric being at least one suspect original metric; and using the at least one suspect original metric to identify the anomalous component.

2. The method of claim 1, wherein the analyzing identifies at least one suspect transformed metric associated with the anomaly, and wherein the inversely transforming inversely transforms the at least one suspect transformed metric to obtain the at least one suspect original metric.

3. The method of claim 1, wherein the using comprising comparing an estimate of at least one non-anomalous original metric with the at least one suspect original metric to identify the anomalous component.

4. The method of claim 3, wherein the comparing comprises determining for a suspect original metric of the at least one suspect original metric an absolute difference between a first value representing the suspect original metric and a second value representing a non-anomalous original metric corresponding to the suspect original metric.

5. The method of claim 4, wherein the non-anomalous metric comprises at least one of a means or variance of an original metric prior to transformation.

6. The method of claim 3, wherein the comparing provides at least one diagnostic score, and wherein the method further comprises:

ranking the at least one suspect original metric based on the at least one diagnostic score to provide at least one ranked suspect original metric; and selecting from the at least one ranked suspect original metric, a suspect original metric indicating the anomaly.

7. The method of claim 6, wherein the selecting chooses a ranked suspect original metric with a highest score in the ranking.

8. The method of claim 3, wherein the comparing comprises for a suspect original metric of the at least one suspect original metric:

subtracting a first value representing an average of a non-anomalous metric prior to transformation that corresponds to the suspect original metric from a second value representing the suspect original metric to obtain a first result;

squaring the first result to obtain a second result; and dividing the second result by a third value representing a variance of the non-anomalous metric prior to transformation to obtain a diagnostic score for the suspect original metric.

9. The method of claim 8, further comprising comparing the diagnostic score for the suspect original metric with one or more other diagnostic scores for one or more other suspect original metrics to determine an anomalous suspect original metric.

10. The method of claim 9, further comprising using the anomalous suspect original metric to identify the anomalous component.

11. A computer program product for facilitating identification of an anomalous component within a processing system, said computer program product comprising:
a non-transitory computer readable storage medium readable by a processing circuit and storing instructions for execution by the processing circuit for performing a method comprising:
transforming one or more original metrics of a processing system being monitored to obtain one or more transformed metrics, wherein the transforming uses a selected mathematical transformation function, the selected mathematical transformation function comprising a Discrete Cosine Transform, a Discrete Wavelet Transform, a multi-dimensional to multi-dimensional mapping or a statistically-estimated transform;
analyzing the one or more transformed metrics of the processing system being monitored, wherein the analyzing detects an anomaly in the processing system;
based on detecting the anomaly in analyzing the one or more transformed metrics, inversely transforming at least one transformed metric of the one or more transformed metrics to obtain at least one original metric of the one or more original metrics, the inversely transforming using a mathematical transformation function to transform the at least one transformed metric back to the at least one original metric, and the at least one original metric being at least one suspect original metric; and
using the at least one suspect original metric to identify the anomalous component.

12. The computer program product of claim 11, wherein the using comprising comparing an estimate of at least one non-anomalous original metric with the at least one suspect original metric to identify the anomalous component.

13. The computer program product of claim 12, wherein the comparing comprises determining for a suspect original metric of the at least one suspect original metric an absolute difference between a first value representing the suspect original metric and a second value representing a non-anomalous original metric corresponding to the suspect original metric.

14. The computer program product of claim 12, wherein the comparing provides at least one diagnostic score, and wherein the method further comprises:
ranking the at least one suspect original metric based on the at least one diagnostic score to provide at least one ranked suspect original metric; and
selecting from the at least one ranked suspect original metric, a suspect original metric indicating the anomaly.

15. The computer program product of claim 12, wherein the comparing comprises for a suspect original metric of the at least one suspect original metric:
subtracting a first value representing an average of a non-anomalous original metric prior to transformation that corresponds to the suspect original metric from a second value representing the suspect original metric to obtain a first result;
squaring the first result to obtain a second result; and
dividing the second result by a third value representing a variance of the non-anomalous original metric prior to transformation to obtain a diagnostic score for the suspect original metric.

16. A computer system for facilitating identification of an anomalous component within a processing system, said computer system comprising:
a memory; and
a processor in communications with the memory, wherein the computer system is configured to perform a method, said method comprising:
transforming one or more original metrics of a processing system being monitored to obtain one or more transformed metrics, wherein the transforming uses a selected mathematical transformation function, the selected mathematical transformation function comprising a Discrete Cosine Transform, a Discrete Wavelet Transform, a multi-dimensional to multi-dimensional mapping or a statistically-estimated transform;
analyzing the one or more transformed metrics of the processing system being monitored, wherein the analyzing detects an anomaly in the processing system;
based on detecting the anomaly in analyzing the one or more transformed metrics, inversely transforming at least one transformed metric of the one or more transformed metrics to obtain at least one original metric of the one or more original metrics, the inversely transforming using a mathematical transformation function to transform the at least one transformed metric back to the at least one original metric, and the at least one original metric being at least one suspect original metric; and
using the at least one suspect original metric to identify the anomalous component.

17. The computer system of claim 16, wherein the using comprising comparing an estimate of at least one non-anomalous original metric with the at least one suspect original metric to identify the anomalous component, and wherein the comparing comprises determining for a suspect original metric of the at least one suspect original metric an absolute difference between a first value representing the suspect original metric and a second value representing a non-anomalous original metric corresponding to the suspect original metric.

18. The computer system of claim 16, wherein the using comprising comparing an estimate of at least one non-anomalous original metric with the at least one suspect original metric to identify the anomalous component, and wherein the comparing provides at least one diagnostic score, and wherein the method further comprises:
ranking the at least one suspect original metric based on the at least one diagnostic score to provide at least one ranked suspect original metric; and
selecting from the at least one ranked suspect original metric, a suspect original metric indicating the anomaly.

19. The computer system of claim 16, wherein the using comprising comparing an estimate of at least one non-anomalous original metric with the at least one suspect original metric to identify the anomalous component, and wherein the comparing comprises for a suspect original metric of the at least one suspect original metric:
subtracting a first value representing an average of a non-anomalous original metric prior to transformation that corresponds to the suspect original metric from a second value representing the suspect original metric to obtain a first result;

squaring the first result to obtain a second result; and
dividing the second result by a third value representing a variance of the non-anomalous original metric prior to transformation to obtain a diagnostic score for the suspect original metric.

* * * * *